Figure 1:
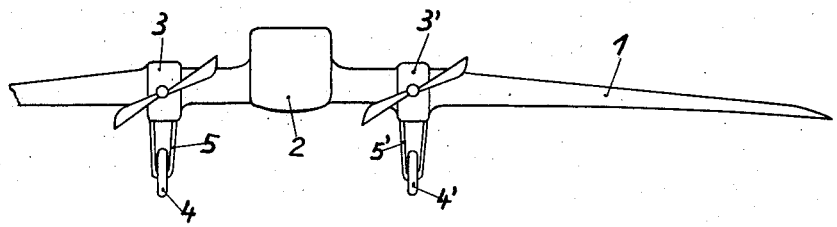

July 11, 1939.   P. G. EHRHARDT ET AL   2,165,465
RETRACTABLE ALIGHTING GEAR FOR AIRPLANES
Filed Nov. 18, 1936   3 Sheets-Sheet 1

INVENTORS:
PAUL G. EHRHARDT and ADOLF SPRATER
by Kurt H. Feist
their Attorney.

INVENTORS:
PAUL G. EHRHARDT and ADOLF SPRATER
their Attorney.

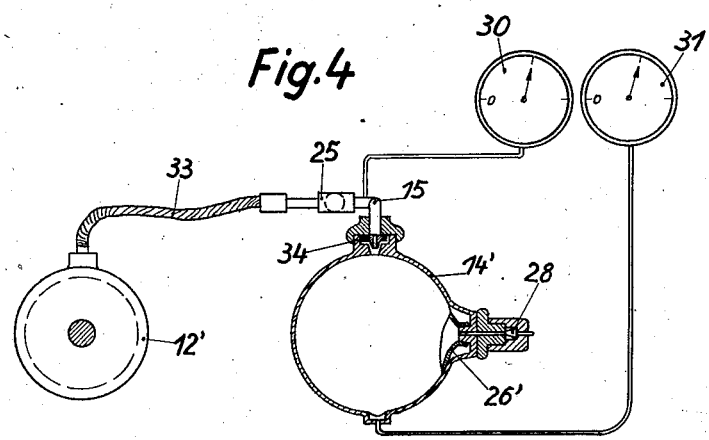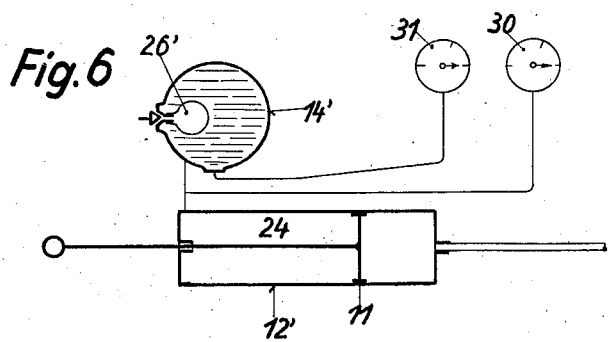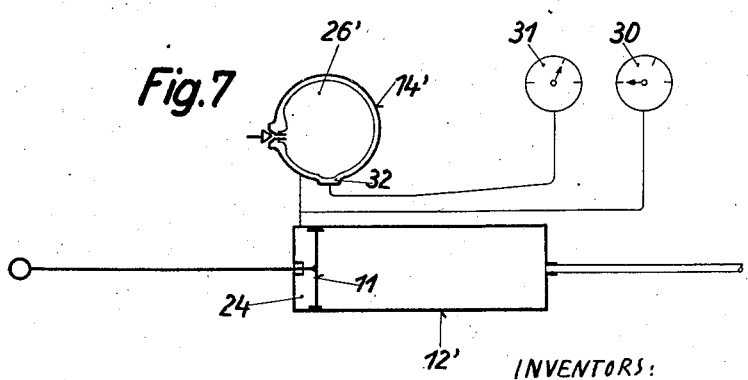

Patented July 11, 1939

2,165,465

UNITED STATES PATENT OFFICE 2,165,465

RETRACTABLE ALIGHTING GEAR FOR AIRPLANES

Paul G. Ehrhardt, Frankfort-on-the-Main, and Adolf Sprater, Berlin-Frohnau, Germany Application November 18, 1936, Serial No. 111,458
In Germany November 14, 1935

5 Claims. (Cl. 244—102)

Our invention relates to airplanes, and more particularly to airplanes provided with retractable landing wheels and shock absorbers.

A hitherto known device for airplanes combining the functions of a retractor for the landing wheels with a shock absorber is provided with a hydraulic system for the retraction and extension of the landing wheels and for the shock absorbing action and has a cushion of a gaseous medium to secure an additional shock absorbing effect. The liquid of the hydraulic system and the gaseous medium are separated from each other by means of a piston movable in a cylinder. There are no means to subject the gaseous medium contacting one side of the piston to a pressure higher than that of the liquid contacting the other side of the piston. At all times the pressure of the gaseous medium is equal to the pressure of the liquid, as otherwise the unavoidable leakage past the surface of the piston would result in an escape of the gaseous medium or the liquid. Thus, it is impossible either to release the liquid from pressure during the flight or to have the gaseous medium under a pressure higher than that of the liquid. The first mentioned feature results in an escape of liquid due to leakage or requires special sealing means, the second mentioned feature results in an undesired long and comparatively ineffective dampening stroke of the strut during the alighting of the airplane.

One object of our invention is to provide a device for airplanes combining the functions of a retractor for the landing wheels with a shock absorber, in which the gaseous medium may be subjected to a pressure higher than that of the liquid without the possibility of undesired leakage during long flights, so that owing to the cushion of gaseous medium being under comparatively high pressure a highly effective shock absorbing action is obtained during the alighting of the airplane.

Another object of our invention is to equip such a device with means to determine the weight of the load carried by the landing wheels.

In order to carry out our invention into practice we provide in an airplane having a landing gear the combination of a cylinder, a piston movably arranged within said cylinder and connected to said landing gear, a hydraulic system for the displacement of said piston within the cylinder to retract and lower the landing gear, said cylinder containing liquid of said hydraulic system, a chamber having rigid walls, a passage, said passage connecting said chamber with said cylinder, and a bag-like diaphragm arranged within said chamber, said bag-like diaphragm having elastic walls and containing a gaseous medium under pressure adapted to absorb shocks of landing transmitted through said piston, said liquid and the walls of the bag-like diaphragm, said bag-like diaphragm conforming to the shape of said chamber, and the elastic walls of said bag-like diaphragm being adapted to be pressed against the rigid walls of said chamber by the pressure of the gaseous medium, when the pressure of the liquid becomes lower than that of the gaseous medium, to provide a support of the bag-like diaphragm by said rigid walls of the chamber against the pressure of the gaseous medium. In a preferred embodiment said chamber is provided with a recess forming a measuring chamber in cooperation with said bag-like diaphragm, a pressure measuring gauge is connected to said measuring chamber, and another pressure measuring gauge is connected to said hydraulic system, so that it is possible to determine the weight of the load carried by the landing gear.

Figure 2:
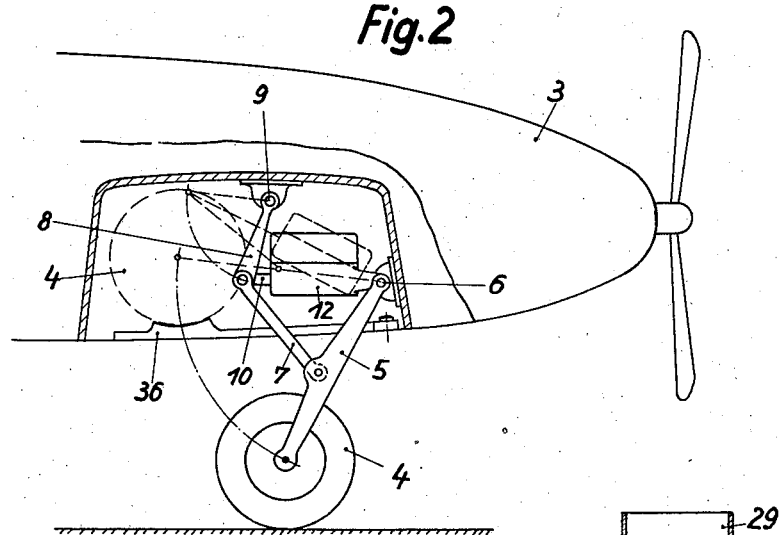
Figure 5:
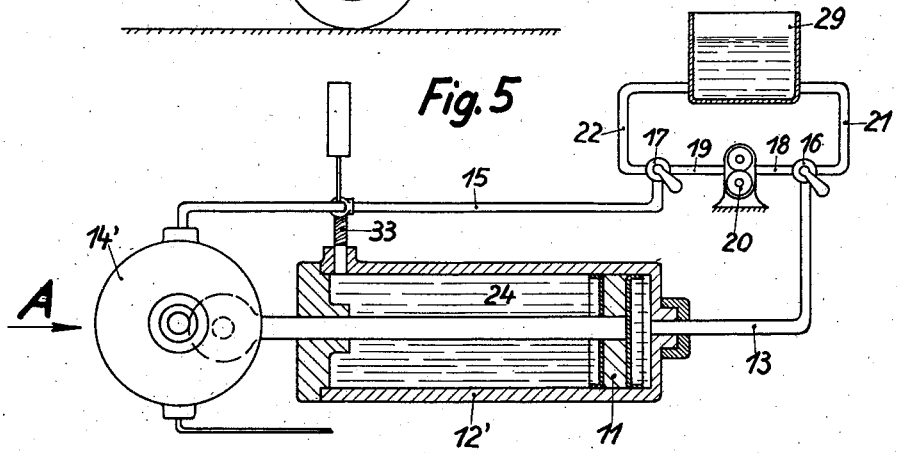
Figure 3:
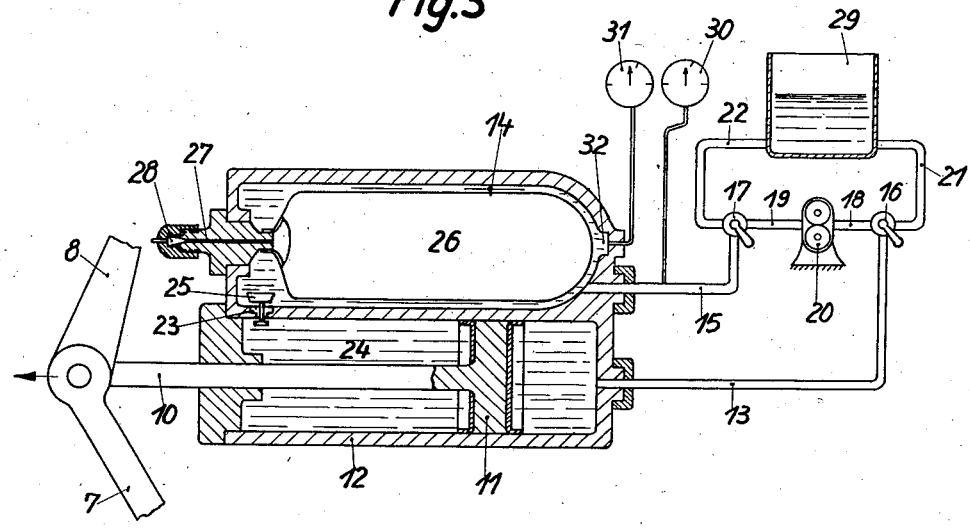
Figure 8:
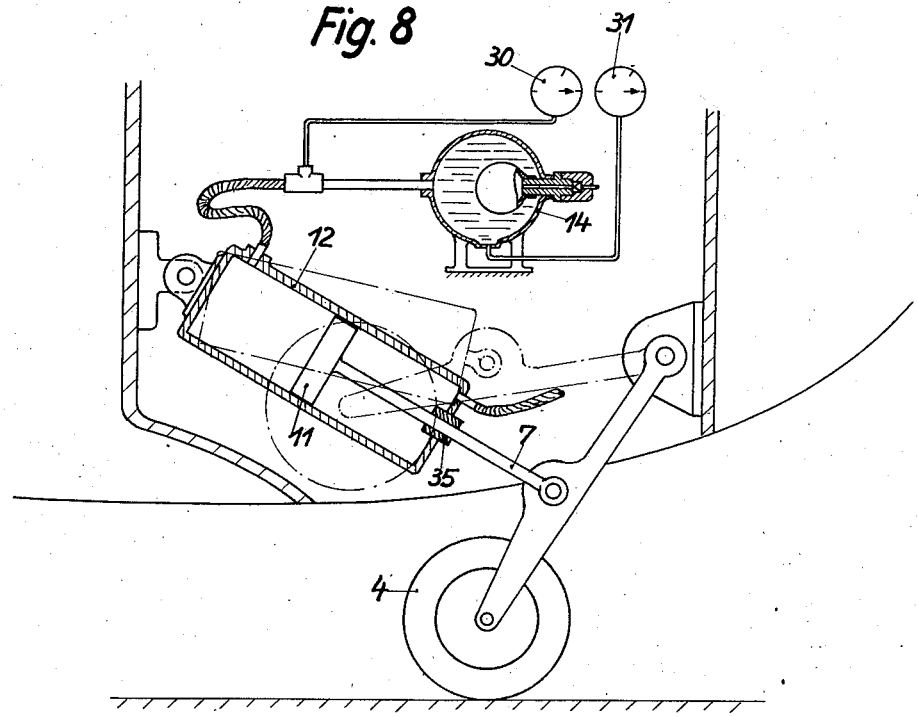

The above mentioned objects and advantages as well as other objects and advantages will be more fully disclosed in the following specification reference being had to the accompanying drawings forming part of this specification, in which:

Fig. 1 is a diagrammatic front view of a two-engined airplane equipped with our new device, Fig. 2 is a side view of the front portion of the fuselage of the airplane, parts being broken away to show the arrangement for retracting the wheels, Fig. 3 is a diagrammatic view of the device with the hydraulic system and the connection to the landing gear, Fig. 4 is a front elevational view, partly in section, of a modified embodiment of the device, the cylinder for the piston and the chamber for the bag-like diaphragm being separated from each other, Fig. 5 is a side elevational view, partly in section, of the device shown in Fig. 4, the parts being in a position in which the wheels are lowered but are not yet loaded by the weight of the airplane, Fig. 6 is a diagrammatic sectional view of the device, the parts being in a position in which the wheels are entirely loaded by the weight of the aeroplane, Fig. 7 is a diagrammatic sectional view of the device, the parts being in a position in which the wheels are retracted, and Fig. 8 is a sectional view of another embodiment of the invention, the piston being shown in a loaded position.

The aircraft according to Fig. 1 has wings 1, a centre fuselage 2 and two lateral fuselages 3 and 3', which are supported by the wheels 4 and 4' being in connection with the fuselages 3 and 3' by means of fork-shaped pairs of reciprocatable struts 5 and 5'. The struts 5, as may be seen from Fig. 2 are pivoted at point 6 of the fuselages 3 and are connected to the fixed axle 9 and to the piston rod 10 by means of the rods 7 and 8.

Referring now to Fig. 3, the right hand end of the rod 10 is provided with a piston 11 movably arranged in a cylinder 12. Said cylinder is pivotally mounted on the above mentioned point 6, as best shown in Fig. 2. A casing 14 is connected to the cylinder 12 and communicates therewith through an opening 23. A pipe 13 connected to the right hand end of the cylinder 12 branches into a pipe 18 and a pipe 21, the former leading to one side of a reversible pump 20, the latter leading to a storage tank 29 containing a liquid medium. A three-way valve 16 is arranged at the branching point and may be adjusted in such a manner, that it connects the pipe 13 either with both the pump 20 and the tank 29 through the pipes 18 and 21 or with the tank 29 alone through the pipe 21 or with the pump 20 alone through the pipe 18. A pipe 15 connected to the right hand end of the casing or chamber 14 branches into a pipe 19 and a pipe 22, the former leading to the other side of said pump 20 the latter leading to said storage tank 29. A three-way valve 17 is arranged at the branching point and may be adjusted in such a way, that it connects the pipe 15 either with both the pipe 22 and the pipe 19 or with the pipe 22 alone or with the pipe 19 alone, or that it shuts off the pipe 15 and connects the pipe 19 with the pipe 22. The liquid medium fills the cylinder 12 as well as the free space in the casing or chamber 14.

The opening or passage 23 connects the casing 14 with the chamber 24 between the piston 11 and the left hand cover of the cylinder 12; in the passage 23 is arranged a valve 25, which opens widely in the direction of flow from the chamber 24 to the chamber 14, but leaves only a small orifice in the opposite direction of flow. The chamber 14 contains a diaphragm or air-bag 26 which can be filled with air or another gaseous medium through the passage 27 and the check-valve 28. The diaphragm or air-bag conforms to the shape of the rigid walls of the chamber 14, so that its elastic walls may be tightly pressed against the rigid walls of the chamber 14 by the pressure of the gaseous medium when the pressure of the liquid becomes lower than the pressure of the gas to provide a support of the bag-like diaphragm by said rigid walls of the chamber against the pressure of the gaseous medium.

The operation of the device is as follows:

(a) In order to carry out the retraction of the wheels, the three-way valves 16 and 17, which may be coupled with each other in any suitable manner (not shown), are adjusted in such a manner, that the valve 16 connects the pipe 13 with the pipe 18 and the valve 17 connects the pipe 15 with both the pipe 19 and the pipe 22. Then, the pump 20 forces the liquid through the pipes 18 and 13 into the cylinder 12, whereby the piston 11 is moved to the left-hand side and the rod 10 lifts the wheels 4 into the retracted position as shown with dash lines in Fig. 2. The left-hand movement of the piston 11 expels the liquid from the chamber 24 through the passage 23 into the casing 14 and from the latter through the pipe 15. If the quantity of liquid sucked by the pump 20 through the pipe 19 is less than the quantity of liquid discharged through the pipe 15, the excess amount of liquid flows through the pipe 22 into the tank 29. If the pump requires more liquid than discharged through the pipe 15, the pump sucks some additional liquid from the tank 29 through the pipes 22 and 19. If the retracted position of the wheel 3 is obtained, the pump 20 can be stopped and the locking member 36 is brought into a locking position below the wheel 4; now the chamber 14 communicates with the tank 29 so that the liquid may flow from the chamber 14 into the tank 29, when during the flight in higher altitudes the diaphragm or air-bag 26 expands until it closely touches the walls of the chamber 14, or may flow from the tank 29 into the chamber 14, when during the descent of the airplane the bag-like diaphragm is compressed by the increasing atmospheric pressure.

(b) After the release of the locking member 36, when the wheels are about to be lowered, prior to the alighting of the airplane, the three-way valves 16 and 17 are brought into such a position, that both pipes 13 and 15 are in connection with the tank 29;—in this case the wheels 4 will be lowered by their own weight while the movement of the piston 11 is sufficiently delayed by the passage 23 and the valve 25 and the pipes 13 and 15 for the liquid—or the three-way valves are brought into such a position, that the pipe 13 communicates with the tank 29 and the suction side of the reversible pump 20 through pipe 18 whereas pipe 15 communicates with pipe 19 and with the pressure side of the pump 20; in this case the operation of the pump is reversed with respect to the operation described in paragraph (a), so that now the pump urges the wheels into their extended position. In both cases the piston 11 will be brought into its extreme right-hand position. By means of further action of the pump 20, the pressure within the circulation system can be increased to that amount which the pneumatic pressure of the air-bag or diaphragm 26 shall have at the moment of alighting. This pressure can be identical to the pressure inside the air-bag when the latter is expanded and touches the walls of the casing 14, but can also be a higher one. The device is now ready for landing as soon as the pipe 15, by bringing the valve 17 into the shut off position, is blocked and is disconnected from the tank 29.

(c) During the landing the weight of the airplane, increased by the dynamic energy of the landing shock, is transmitted by means of the rods 7, 8 and 10 to the piston 11 and tends to move the latter into a left-hand position in which the chamber 24 is reduced in size. The liquid displaced by this movement of the piston flows through the passage 23 into the chamber 14 and compresses the air-bag 26 until the pneumatic pressure increased during the compression balances the force of the piston 11 by means of the liquid. When the dynamic force of the landing shock has been absorbed in this manner the pneumatic pressure exceeds the pressure exerted by the piston, the air-bag 26 expands again and forces liquid from the chamber 14 into chamber 24 through the restricted passage 23, so that the piston 11 is moved in the right-hand direction, until the pneumatic pressure has been decreased to an amount required for carrying the weight of the airplane. The return movement of the piston is, however, considerably retarded by the valve 25 in comparison with the movement in the opposite direction.

(d) When the airplane is resting on the ground, its weight is taken up by the piston 11 and the latter will therefore be displaced in the direction of a reduction of chamber 24 until the increasing counter-pressure of the air-bag 26 balances the weight. The pressure in the air-bag 26 and in the chambers connected with it is therefore, a criterion for measuring the weight resting on each respective strut.

When the wheel does not carry any weight, the pressure gauge 30 connected to the pipe 15 indicates the pressure of the liquid in the system, the pressure gauge 31 connected to the chamber 32, however, indicates the pneumatic pressure transmitted through the walls of the air-bag 26 onto the liquid being in the chamber 32 as soon as the air-bag lies closely on the walls of the chamber 14 and separates the liquid in the chamber 32 from the other liquid in the system.

Figs. 4 and 5 show in diagrammatic representation a modified embodiment according to which the pneumatic chamber 14' for the reception of the gas is arranged separately from the cylinder 12'. Like reference numerals are used to represent the parts which are identical to the parts shown in Figs. 2 and 3. The chamber 14' and the pneumatic diaphragm or air-bag 26' enclosed by said chamber are of substantially spherical shape. The chamber 24 of the cylinder 12' is connected with the pipes 15 and with the air-chamber 14' by means of a flexible tube 33. The valve 25 damping in one direction may be arranged in pipe 15, but it may be replaced as well by a valve 34 acting in the same manner and being arranged at the inlet of the chamber 14'. If desired, however, both damping means, i. e. the valves 25 and 34, may be arranged in series as shown in Fig. 4 for example.

In Figs. 4 and 5 the piston 11 is shown in such a position in which the wheel 4 is lowered and is ready for the landing. The pressure gauges 30 and 31 are now both showing the same pressure which corresponds to that maintained by the gaseous medium if the air-bag 26 touches closely the walls of the pneumatic chamber 14'.

Fig. 6 shows in diagrammatic representation that position where the struts carrying the wheels are weighed down by a heavy load of the airplane. In this case the piston 11 is pushed towards the left, the air-bag 26' is compressed and both pressure gauges 30 and 31 indicate the same high pressure corresponding to the weight.

In the position of Fig. 7 the wheels are retracted, the piston 11 is in its extreme left-hand position, the chamber 24 is in connection with the storage tank 29 and the pressure gauge 30 points at zero. The air-bag 26' closely touches the walls of the casing 14' and the pressure gauge 31 indicates, therefore, by means of the recess 32 that pressure which shall be the minimum pressure of the air-cushion.

The fact, that in the position of Fig. 6 the pressure gauges 30 and 31 indicate a pressure corresponding to the weight, may be employed to control by the aid of these pressure gauges the loading of the aircraft with fuel or useful load. It will then be necessary to total the readings from the various struts, i. e., as a rule the weight carried by both wheels and by the tail-skid.

Fig. 8 shows an arrangement according to which the rod 7 is directly connected with the piston 11 and passes through a stuffing-box 35 arranged on the particular side of the cylinder where the cylinder walls are not subjected to the high pressure of the air-chamber 15 in the alighting position of the airplane. This arrangement facilitates the sealing of the rod 7 in the stuffing-box 35. In the position shown in the drawings, the airplane is fully loaded.

What we claim is:

1. In an airplane having a landing gear, the combination of a cylinder, a piston movably arranged within said cylinder and connected to said landing gear, a hydraulic system for the displacement of said piston within the cylinder to retract and lower the landing gear, said cylinder containing liquid of said hydraulic system, a chamber having rigid walls, a passage, said passage connecting said chamber with said cylinder, and a bag-like diaphragm arranged within said chamber, said bag-like diaphragm having elastic walls and containing a gaseous medium under pressure adapted to absorb shocks of landing transmitted through said piston, said liquid and the walls of said bag-like diaphragm, said bag-like diaphragm conforming to the shape of said chamber, and the elastic walls of said bag-like diaphragm being adapted to be pressed against the rigid walls of said chamber by the pressure of the gaseous medium, when the pressure of the liquid becomes lower than that of the gaseous medium, to provide a support of the bag-like diaphragm by said rigid walls of the chamber against the pressure of the gaseous medium.

2. In an airplane having a landing gear, the combination of a cylinder, a piston movably arranged within said cylinder and connected to said landing gear, a hydraulic system for the displacement of said piston within the cylinder to retract and lower the landing gear, said cylinder containing liquid of said hydraulic system, a chamber, a passage, said passage connecting said chamber with said cylinder, said chamber being provided with a recess, a bag-like diaphragm arranged within said chamber, said bag-like diaphragm containing a gaseous medium separated from said liquid and adapted to absorb shocks of landing transmitted through said piston and said liquid, said bag-like diaphragm conforming to the shape of said chamber and being adapted to be pressed against the walls of said chamber by the pressure of the gaseous medium and to form a measuring chamber in cooperation with said recess, a pressure measuring gauge connected to said measuring chamber, and a pressure measuring gauge connected to said hydraulic system.

3. In an airplane having a landing gear, the construction as claimed in claim 1, said hydraulic system including a storage tank, a reversible pump, a line connecting the tank with one side of the pump, another line connecting the tank with the other side of the pump, a pipe connecting one end of the cylinder with one line of said lines, another pipe connecting said chamber with the other line, and controlling three-way valves arranged at the points of junction between said pipes and lines.

4. In an airplane having a landing gear, the construction as claimed in claim 1, said hydraulic system including a storage tank, a reversible pump, a line connecting the tank with one side of the pump, another line connecting the tank with the other side of the pump, a pipe connecting one end of the cylinder with one line of said lines, another pipe connecting said chamber with the other line, controlling three-way valves arranged at the points of junction between said pipes and lines, and controlling means arranged in said passage between said cylinder and said chamber, said controlling means permitting a free flow of the liquid from said cylinder into said chamber and throttling the flow of the liquid from said chamber into said cylinder.

5. An airplane as claimed in claim 2, in which said pressure measuring gauge is provided with a scale indicating the weight carried by the landing gear.

ADOLF SPRATER.
PAUL G. EHRHARDT.